United States Patent
Ebert et al.

(10) Patent No.: US 10,266,649 B2
(45) Date of Patent: Apr. 23, 2019

(54) POLYETHERAMINES WITH LOW MELTING POINT

(71) Applicants: BASF SE, Ludwigshafen (DE); The Procter & Gamble Company, Cincinnati, OH (US)

(72) Inventors: Sophia Ebert, Mannheim (DE); Bjoern Ludolph, Ludwigshafen (DE); Brian J. Loughnane, Sharonville, OH (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/544,765

(22) PCT Filed: Jan. 21, 2016

(86) PCT No.: PCT/EP2016/051176
§ 371 (c)(1),
(2) Date: Jul. 19, 2017

(87) PCT Pub. No.: WO2016/120141
PCT Pub. Date: Aug. 4, 2016

(65) Prior Publication Data
US 2018/0009942 A1    Jan. 11, 2018

(30) Foreign Application Priority Data

Jan. 26, 2015 (EP) .................... 15152554

(51) Int. Cl.
    C08G 65/26    (2006.01)
    C08G 65/34    (2006.01)
    C08G 73/02    (2006.01)
    C08G 65/322   (2006.01)
    C08G 65/326   (2006.01)
    C08G 65/327   (2006.01)

(52) U.S. Cl.
    CPC ..... C08G 65/2624 (2013.01); C08G 65/2609 (2013.01); C08G 65/322 (2013.01); C08G 65/326 (2013.01); C08G 65/327 (2013.01); C08G 65/34 (2013.01); C08G 73/024 (2013.01); C08G 2650/24 (2013.01); C08G 2650/30 (2013.01); C08G 2650/32 (2013.01); C08G 2650/50 (2013.01)

(58) Field of Classification Search
    CPC ............ C08G 65/2624; C08G 65/2609; C08G 65/322; C08G 65/326; C08G 65/327; C08G 65/34; C08G 65/14
    See application file for complete search history.

(56) References Cited

U.S. PATENT DOCUMENTS

| | | | |
|---|---|---|---|
| 5,939,463 A | 8/1999 | Wu et al. | |
| 2009/0124529 A1* | 5/2009 | Danziger | C08G 73/02 510/276 |
| 2010/0234631 A1* | 9/2010 | Misske | C08G 73/024 558/27 |
| 2014/0014004 A1 | 1/2014 | Mueller-Cristadoro et al. | |

FOREIGN PATENT DOCUMENTS

| | | |
|---|---|---|
| EP | 0441198 B1 | 12/1993 |
| WO | 0212180 A1 | 2/2002 |
| WO | 2004024858 A1 | 3/2004 |
| WO | 2005092952 A1 | 10/2005 |
| WO | 2009060059 A2 | 5/2009 |
| WO | 2009060060 A1 | 5/2009 |
| WO | 2011032640 A2 | 3/2011 |
| WO | 2014012812 A1 | 1/2014 |

OTHER PUBLICATIONS

International Search Report for International Patent Application No. PCT/EP2016/051176, dated Apr. 8, 2016, 3 pages.
Written Opinion of International Searching Authority for International Patent Application No. PCT/EP2016/051176, dated Apr. 8, 2016, 4 pages.

* cited by examiner

*Primary Examiner* — Shane Fang
(74) *Attorney, Agent, or Firm* — Armstrong Teasdale LLP

(57) ABSTRACT

Described herein are substituted polyetheramines with a low melting point which are obtainable by condensation of at least two N-(hydroxyalkyl)amines to obtain a polyetheramine and subsequent reaction of at least one remaining hydroxy group and/or, if present, at least one secondary amino group of said polyetheramine with ethylene oxide and at least one further alkylene oxide to obtain a substituted polyetheramine. Uses of such substituted polyetheramines in fields of cosmetic formulations, as crude oil emulsion brakers, in pigment dispersions of ink jets, in electro paintings, or in cementitious compositions as well as methods wherein said substituted polyetheramines are used in said fields are described herein.

13 Claims, No Drawings

POLYETHERAMINES WITH LOW MELTING POINT

CROSS-REFERENCE TO RELATED APPLICATIONS

This application is a U.S. National Phase Application of PCT/EP2016/051176, filed Jan. 21, 2016, which claims the benefit of priority to EP Patent Application No. 15152554.0, filed Jan. 26, 2015, the entire contents of which are hereby incorporated by reference herein.

BACKGROUND

The present invention relates to substituted polyetheramines with a low melting point which are obtainable by condensation of at least two N-(hydroxyalkyl)amines to obtain a polyetheramine and subsequent reaction of at least one remaining hydroxy group and/or, if present, at least one secondary amino group of said polyetheramine with ethylene oxide and at least one further alkylene oxide to obtain a substituted polyetheramine. The present invention also relates to the use of such substituted polyetheramines in fields of cosmetic formulations, as crude oil emulsion brakers, in pigment dispersions of ink jets, in electro paintings, or in cementitious compositions as well as methods wherein said substituted polyetheramines are used in said fields.

In WO 2009/060060, alkoxylated polyalkanolamines are described. Such polyalkanolamines are described to be obtainable by condensation of alkanolamines. In WO 2009/060060, the polyalkanolamines are alkoxylated with ethylene oxide (EO), propylene oxide (PO), butylene oxide (BuO), pentene oxide (PeO), hexane oxide (HeO) or styrene oxide. The polyalkanolamine is described to be reacted with 1 to 100 moles of at least one alkylene oxide which is in turn reacted with 1 mole of the remaining hydroxy groups and, if present, of the secondary amino groups of the polyether obtained in the condensation reaction. The polyalkanolamines are obtained from alkanolamines as described in WO 2009/060060 or as described in US20140014004.

WO 2011/032640 describes polyalkanolamines obtained by a base-catalyzed condensation of alkanolamines and alkoxylated with 1-200 $C_2$-$C_4$ alkylene oxides per hydroxy group.

Ethoxylates of polyetheramines such as, e.g., ethoxylated poly-triethanolamin (polyTEA) exhibit dispersion effects in washing compositions for, e.g., mineralic dirt (such as clay). A disadvatange of such products is that they are solid (waxy) at room temperature and have to be melted or diluted for further processing. Yet, dilution of such products with water does not only involve the disadvantage of reduced content of active substances but also the disadvantage that water is placed into the washing composition. Such water content can be particularly undesired, e.g., in single unit dosage (SUD) formats of washing compositions.

This and other technical problems have been overcome by the present invention as described herein and as defined in the claims.

DETAILED DESCRIPTION

The present invention relates to substituted polyetheramines obtainable by
(a) Condensation of at least two N-(hydroxyalkyl)amines, wherein said N-(hydroxyalkyl)amines are independently selected from the group consisting of N-(hydroxyalkyl)amines according to formula Ia and Ib, respectively:

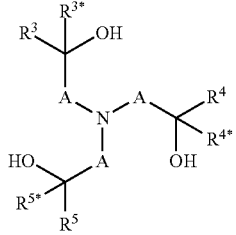

(formula Ia)

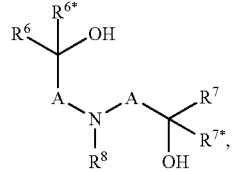

(formula Ib)

wherein
A is independently selected from the group consisting of linear or branched $C_1$-alkylene, $C_2$-alkylene, $C_3$-alkylene, $C_4$-alkylene, $C_5$-alkylene, and $C_6$-alkylene;
$R^3$, $R^{3*}$, $R^4$, $R^{4*}$, $R^5$, $R^{5*}$, $R^6$, $R^{6*}$, $R^7$, $R^{7*}$ and $R^8$ are independently selected from the group consisting of H; linear or branched, substituted or non-substituted alkyl; substituted or non-substituted cycloalkyl; and substituted or non-substituted aryl,
to obtain a polyetheramine; and
(b) Reacting at least one remaining hydroxy group and/or, if present, at least one secondary amino group of the polyetheramine obtained in (a) with ethylene oxide and at least one further alkylene oxide selected from the group consisting of propylene oxide, butylene oxide, and pentene oxide,
to obtain a substituted polyetheramine which is substituted with at least one alkylenoxy unit E,
wherein E is an alkylenoxy unit according to formula II:

$$-(-CH_2CH_2O-)_{\overline{m}}(-R^1-O-)_{\overline{n}}(-CH_2CH_2O-)_{\overline{p}}-R^2 \quad \text{(formula II)}$$

wherein
$R^1$ is independently selected from the group consisting of 1,2-propylene, 1,2-butylene, and 1,2-pentene;
$R^2$ is independently selected from the group consisting of H, any of $C_1$ to $C_{22}$ alkyl, and any of $C_7$ to $C_{22}$ aralkyl
m is an integer independently selected from values in the range of from 5 to 18;
n is an integer independently selected from values in the range of from 1 to 5; and
p is an integer independently selected from values in the range of from 2 to 14.

As has been surprisingly found in the present invention, an inner block of propyleneoxide (PO), butyleneoxide (BuO) or pentenoxide (PeO) within the polyetheramine's alkylenoxy unit is able to reduce the melting point of the polyetheramine. In one embodiment of the present invention, such inner block of propylenoxide (PO), butyleneoxide (BuO) or pentenoxide (PeO) within the polyetheramine's alkylenoxy unit is able to reduce the melting point of the polyetheramine below room temperature (e.g., 20° C.). That is, the inventive polyetheramines may have a melting point below 30° C., preferably below 25° C., more preferably below 22° C., more preferably below 20° C., more preferably below 18° C., more preferably below 16° C., and most preferably below 15° C. (at 1 bar ambient pressure). Furthermore, it has been surprisingly found that such PO-, BuO- or PeO-containing polyetheramines exhibit a desired dispersion effect in washing compositions.

In one embodiment of the present invention, the polyetheramine is prepared by mainly condensing N-(hydroxyalkyl)amines according to formula Ia and no or little hydroxyalkyl)amines according to formula Ib, the ratio of N-(hydroxyalkyl)amines according to formula Ia to hydroxyalkyl)amines according to formula Ib varies from 100:0 to 0:100, preferably 85:15, and most preferably 100:0. In one embodiment of the present invention, the polyetheramine is prepared by condensing N-(hydroxyalkyl)amines according to formula Ia and not hydroxyalkyl)amines according to formula Ib.

For the N-(hydroxyalkyl)amines according to formula Ia or Ib to be condensed in accordance with the present invention, A can be independently selected from the group consisting of linear or branched $C_1$-alkylene, C-alkylene, $C_3$-alkylene, $C_4$-alkylene, $C_5$-alkylene, and $C_6$-alkylene. Said linear or branched alkylenes can be substituted or non-substituted, preferably they are non-substituted. In one embodiment of the present invention, A is mainly (preferably at least or more than 98%) or only a $C_1$-alkylene or $C_2$-alkylene, preferably $C_1$-alkylene. Furthermore, in one embodiment $R^{3*}$, $R^{4*}$, $R^{5*}$ $R^{6*}$, and $R^{7*}$ are H, and $R^3$, $R^4$, $R^5$, $R^6$, $R^7$ are H or methyl. Accordingly, in one embodiment of the present invention, the N-(hydroxyalkyl)amines to be condensed according to the present invention are mainly (preferably at least or more than 85%, more preferably at least or more than 98%) triethanolamines or only triethanolamines and/or triisopropanolamines, preferably triethanolamines.

Generally, unless otherwise specified herein, the term "substituted" refers to H-atoms of a particular group which may be substituted. That is, e.g., if reference is made to a "substituted alkyl", the H-atoms of said alkyl may be substituted accordingly, not the entire alkyl itself. The same applies mutatis mutandis to other groups which may be substituted as described herein.

For the N-(hydroxyalkyl)amines according to formula Ia or Ib to be condensed in accordance with the present invention, $R^3$, $R^{3*}$, $R^4$, $R^{4*}$, $R^5$, $R^{5*}$, $R^6$, $R^{6*}$, $R^7$, $R^{7*}$ and $R^8$ can be independently selected from the group consisting of H; linear or branched, substituted or non-substituted alkyl; substituted or non-substituted cycloalkyl; and substituted or non-substituted aryl. In this context, said substituted alkyls may be substituted with, e.g., hydroxyl, halogen, cyano, or $C_1$ to $C_4$ alkoxy, and said substituted cycloalkyls and aryls may be substituted with, e.g., hydroxyl, halogen, cyano, $C_1$ to $C_4$ alkyl, or $C_1$ to $C_4$ alkoxy. In one embodiment of the present invention, any one or all of $R^3$, $R^{3*}$, $R^4$, $R^{4*}$, $R^5$, $R^{5*}$, $R^6$, $R^{6*}$, $R^7$ and $R^{7*}$ is/are independently from one another H, methyl or ethyl, preferably H or methyl. In a further embodiment, $R^8$ is selected from the group consisting of H, methyl, ethyl, and butyl.

Condensation as described herein and as to be performed in accordance with the present invention (step (a)) can be carried out as known to the skilled person and as described in, e.g., EP 0441198, U.S. Pat. No. 5,939,463, or WO 2014/012812. Alkoxylation as described herein and as to be performed in accordance with the present invention (step (b)) can be carried out as known to the skilled person and as described in, e.g., WO 2009/060060.

According to the present invention, after the condensation step (a), in step (b) at least one remaining hydroxy group and/or, if present, at least one secondary amino group of the polyetheramine obtained after said condensation in step (a) is reacted with ethylene oxide (EO) and at least one further alkylene oxide selected from the group consisting of PO, BuO, and PeO. As the skilled person is readily aware of, after condensing the N-(hydroxyalkyl)amines according to step (a), there is always at least one hydroxy group left unless extremely high temperatures were applied over a long reaction time. In the latter case where such extremely high temperatures were applied over a long period of time, however, a solid mass would be obtained which can no longer be handled. Furthermore, as also readily understandable for the skilled person, said at least one secondary amino group may be present if a compound according to formula Ib was condensed according to the present invention and at least one $R^8$ was selected to be H. In one embodiment of the present invention, said alkylene oxide selected from the group consisting of PO, BuO, and PeO to be reacted with the polyetheramine obtained after the condensation step (a) is a 1,2-alkylene oxide, i.e. selected from the group consisting of 1,2-PO, 1,2-BuO, and 1,2-PeO. In a further embodiment of the present invention, said alkylene oxide to be reacted with said polyetheramine is 1,2-PO.

Accordingly, in one embodiment of the present invention, $R^1$ of the alkylenoxy unit according to formula II may be 1,2-propylene. In a further embodiment of the present invention, for $R^2$ of the alkylenoxy unit according to formula II, H or $C_1$ to $C_4$ alkyl may be selected, preferably H.

In one embodiment of the present invention, regarding the alkylenoxy unit E, m may be 7 to 14, preferably 8 to 12, more preferably 10 to 12. In a further embodiment of the present invention, n may be 1 to 5, preferably 1 to 3, more preferably 2 to 3. In a further embodiment of the present invention, p may be 5 to 12, preferably 6 to 11, more preferably 8 to 9. In one embodiment of the present invention, the total length of the alkylenoxy unit E m+n+p may 15 to 30, preferably 18 to 24.

In context with the present invention, the substituted polyetheramine obtainable as described herein may further be modified by quaternization, protonation, sulfation, transsulfation, and/or phosphation by methods known in the art and as described herein. In one embodiment of the present invention, the substituted polyetheramine is modified by quaternization or quaternization with additional transsulfation. Quaternization may be performed, e.g., with an alkyl group. The degree of quaternization in this context may be, e.g., up to 100%, preferably 10% to 95%.

The quaternization may be advantageous in order to adjust the substituted polyetheramines of the present invention to the particular uses as described herein, e.g. for cosmetic compositions in which they are to be used, and to achieve better compatibility and/or phase stability of the formulation.

The quaternization of substituted polyetheramines of the present invention may be achieved, e.g., by introducing $C_1$-$C_{22}$ alkyl, $C_1$-$C_4$-alkyl groups and/or $C_7$-$C_{22}$ aralkyl, aryl or alkylaryl groups and may be performed in a customary manner by reaction with corresponding alkyl-, aralkyl-halides and dialkylsulfates, as described for example in WO 2009/060059.

Quaternization can be accomplished, for example, by reacting a substituted polyetheramines of the present invention with an alkylation agent such as a $C_1$-$C_4$-alkyl halide, for example with methyl bromide, methyl chloride, ethyl chloride, methyl iodide, n-butyl bromide, isopropyl bromide, or with an aralkyl halide, for example with benzyl chloride, benzyl bromide or with a di-$C_1$-$C_{22}$-alkyl sulfate in the presence of a base, especially with dimethyl sulfate or with diethyl sulfate. Suitable bases are, for example, sodium hydroxide and potassium hydroxide.

The amount of alkylating agent determines the amount of quaternization of the amino groups in the polymer, i.e. the amount of quaternized moieties.

The amount of the quaternized moieties can be calculated from the difference of the amine number in the non-quaternized amine and the quaternized amine.

The amine number may be determined according to the method described in DIN 16945.

The reaction may be carried out without any solvent. However, a solvent or diluent like water, acetonitrile, dimethylsulfoxide, N-Methylpyrrolidone, etc. may be used. The reaction temperature may be in the range from 10° C. to 150° C., and is preferably from 50° C. to 100° C.

In one embodiment, the inventive quaternized or non-quaternized substituted polyetheramines can be (additionally) sulfatized or transsulfatized if $R^2$ in formula II is H. For example, the inventive quaternized substituted polyetheramines may be sulfatized or transsulfatized. The quaternized substituted polyetheramines can be sulfatized or transsulfatized in accordance with methods known in the art, e.g. as described in WO 2005/092952. Sulfation or transsulfatation can be achieved with e.g. dimethylsulfate.

The sulfation of the polymers according to the present invention may be affected by a reaction with sulfuric acid or with a sulfuric acid derivative. Suitable sulfation agents include, e.g., sulfuric acid (preferably 75% to 100% strength, more preferably 85% to 98% strength), oleum, $SO_3$, chlorosulfonic acid, sulfuryl chloride, amidosulfuric acid, and the like. If sulfuryl chloride is being used as sulfation agent, the remaining chlorine is being replaced by hydrolysis after sulfation. The sulfation agent may be used in equimolar amounts or in excess, e.g. 1 to 1.5 moles per OH-group present in the polymer. However, the sulfation agent may also be used in sub-equimolar amounts. The sulfation can be effected in the presence of a solvent. A suitable solvent includes, e.g., toluene. After the sulfation the reaction mixture may be neutralized and worked up in a conventional manner known in the art.

As described above, it is also possible to quaternize and transsulfatize substituted polyetheramines obtainable according to the present invention. A sulfation process may be described as transsulfation process, where an alkoxylated polyamine or an alkoxylated polyalkylenimine is first reacted with a di-$C_1$-$C_4$-alkyl sulfate to form a quaternized polyamine and a sulfating species as counterion, and then followed by reacting the hydroxyl groups with the sulfating species, leading to a quaternized and sulfated. Examples for transsulfation processes are described inter alia in WO 2004/024858 or WO 2002/012180.

Combined quaternization and sulfatization can be achieved, e. g., by first reacting an substituted polyetheramine with a di-$C_1$-$C_4$-alkyl sulfate in the presence of a base, then acidifying the reaction mixture obtained from quaternization, for example with a carboxylic acid, such as methane sulfonic acid, or with a mineral acid such as phosphoric acid, sulfuric acid or hydrochloric acid. The process may be conducted at a pH less than 6, preferably less than pH 3, at temperatures from 0° C. to 200° C., preferably 50° C. to 150° C. After the transsulfation, the reaction mixture may be neutralized as known in the art.

The present invention further relates to the use of substituted polyetheramines obtainable according to the present invention in cosmetic formulations, as crude oil emulsion breakers, in pigment dispersions of ink jets, in electro platings, or in cementitious compositions. Also described and exemplified herein is the use of substituted polyetheramines obtainable according to the present invention in washing- and cleaning compositions.

As used herein the term "cleaning composition" includes compositions and formulations designed for cleaning soiled material. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, dish washing compositions, hard surface cleaning compositions, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation. The cleaning compositions may have a form selected from liquid, powder, single-phase or multi-phase unit dose, pouch, tablet, gel, paste, bar, or flake.

The cleaning compositions comprise a surfactant system in an amount sufficient to provide desired cleaning properties. In some embodiments, the cleaning composition comprises, by weight of the composition, from about 1% to about 70% of a surfactant system. In other embodiments, the liquid cleaning composition comprises, by weight of the composition, from about 2% to about 60% of the surfactant system. In further embodiments, the cleaning composition comprises, by weight of the composition, from about 5% to about 30% of the surfactant system. The surfactant system may comprise a detersive surfactant selected from anionic surfactants, nonionic surfactants, cationic surfactants, zwitterionic surfactants, amphoteric surfactants, ampholytic surfactants, and mixtures thereof. Those of ordinary skill in the art will understand that a detersive surfactant encompasses any surfactant or mixture of surfactants that provide cleaning, stain removing, or laundering benefit to soiled material.

The following examples shall illustrate the invention provided and described herein and must not be construed as limiting the invention to the parameters and embodiments described in the examples.

EXAMPLES

In the examples, the following abbreviations are used:
EO ethylene oxide
PO propylene oxide
x EO/OH x moles ethylene oxide per mole of hydroxyl groups in the polyetheramine
y PO/OH y moles propylene oxide per mole of hydroxyl groups in the polyetheramine Melting points are determined according to DIN 51007 with a differential scanning calorimeter 823/700/229 from Mettler Toledo.

Example 1

Polytriethanolamine+11 EO/OH+2 PO/OH+8 EO/OH 1 (a) Polytriethanolamine

A four-neck flask equipped with stirrer, distillation bridge, gas inlet tube, and internal thermometer was charged with 1500 g triethanolamine and 20 g of a 50% by weight aqueous solution of $H_3PO_2$. The mixture was heated under nitrogen to 200° C. The reaction mixture was stirred at 200° C. over a period of 15.5 h during which the condensate formed in the reaction was removed by means of a moderate stream of $N_2$ as stripping gas via the distillation bridge. Toward the end of the reaction time indicated, the temperature was lowered to 140° C. Residual low molecular weight products were removed under a pressure of 100 mbar. Then the reaction mixture was cooled to ambient temperature, and polytriethanolamine (OH number: 585 mg KOH/g, amine number: 423 mg KOH/g, dynamic viscosity at 60° C.: 431 mPas, Mn=4450 g/mol, Mw=8200 g/mol was obtained. Molecular weight was determined by gel permeation chromatography using a refractometer as the detector. The mobile phase used was hexafluoroisopropanol (HFIP), the standard employed for determining the molecular weight being polymethylmethacrylate (PMMA).

1 (b) Polytriethanolamine+11 EO/OH+2 PO/OH+8 EO/OH

In a 2 l autoclave, 90.0 g polytriethanolamine obtained in example 1 (a) and 3.9 g potassium hydroxide (50% aqueous solution) were mixed and stirred under vacuum (<10 mbar) at 120° C. for 2 h. The autoclave was purged with nitrogen and heated to 140° C. 453.8 g ethylene oxide was added within 5 h, followed by the addition of 108.7 g propylene oxide within 1 h and afterwards 330.0 g ethylene oxide within 3 h. To complete the reaction, the mixture was allowed to post-react for additional 10 h at 140° C. The reaction mixture was stripped with nitrogen and volatile compounds were removed in vacuo at 80° C. 984.0 g of a light brown liquid was obtained (melting point: 14.6° C.).

Example 2

Polytriethanolamine+11 EO/OH+3 PO/OH+8 EO/OH

In a 2 l autoclave, 90.0 g polytriethanolamine obtained in example 1 (a) and 4.2 g potassium hydroxide (50% aqueous solution) were mixed and stirred under vacuum (<10 mbar) at 120° C. for 2 h. The autoclave was purged with nitrogen and heated to 140° C. 453.8 g ethylene oxide was added within 5 h, followed by the addition of 163.1 g propylene oxide within 1 h and afterwards 330.0 g ethylene oxide within 3 h. To complete the reaction, the mixture was allowed to post-react for additional 10 h at 140° C. The reaction mixture was stripped with nitrogen and volatile compounds were removed in vacuo at 80° C. 1038.0 g of a light brown liquid was obtained (melting point: 13.5° C.).

Comparative Example 1

Polytriethanolamine+20 ethylene oxide/OH

In a 2 l autoclave, 66.0 g polytriethanolamine obtained in example 1 (a) and 2.7 g potassium hydroxide (50% aqueous solution) were mixed and stirred under vacuum (<10 mbar) at 120° C. for 2 h. The autoclave was purged with nitrogen and heated to 140° C. 605.6 g ethylene oxide was added within 6 h. To complete the reaction, the mixture was allowed to post-react for additional 10 h at 140° C. The reaction mixture was stripped with nitrogen and volatile compounds were removed in vacuo at 80° C. 653.6 g of a light brown solid was obtained (melting point: 33.0° C.).

The invention claimed is:

1. Substituted polyetheramine obtainable by
   (a) Condensation of at least two N-(hydroxyalkyl)amines, wherein said N-(hydroxyalkyl)amines are independently selected from the group consisting of N-(hydroxyalkyl)amines according to formula Ia and Ib, respectively:

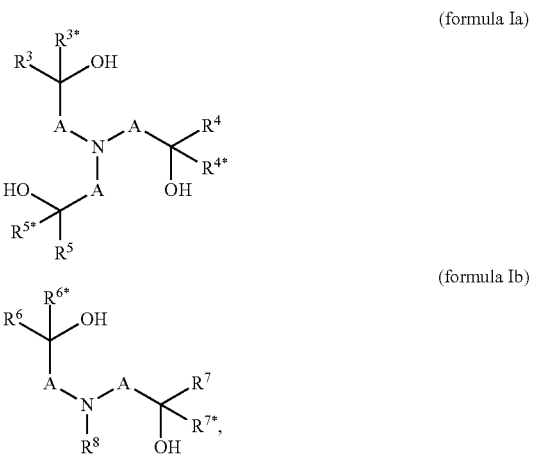

wherein
A is independently selected from the group consisting of linear $C_1$-alkylene, branched $C_1$-alkylene, linear $C_2$-alkylene, branched $C_2$-alkylene, linear $C_3$-alkylene, branched $C_3$-alkylene, linear $C_4$-alkylene, branched $C_4$-alkylene, linear $C_5$-alkylene, branched $C_5$-alkylene, linear $C_6$-alkylene, and branched $C_6$-alkylene, $R^3$, $R^{3*}$, $R^4$, $R^{4*}$, $R^5$, $R^{5*}$, $R^6$, $R^{6*}$, $R^7$, $R^{7*}$ and $R^8$ are independently selected from the group consisting of H; linear substituted alkyl; branched substituted alkyl; linear non-substituted alkyl; branched non-substituted alkyl; substituted acycloalkyl; non-substituted acycloalkyl; substituted aryl; and non-substituted aryl to obtain a polyetheramine; and
   (b) reacting at least one of the following: (i) at least one remaining hydroxy group and, (ii) at least one secondary amino group of the polyetheramine obtained in (a) with ethylene oxide and at least one further alkylene oxide selected from the group consisting of propylene oxide, butylene oxide, and pentene oxide
   to obtain a substituted polyetheramine which is substituted with at least one alkylenoxy unit E,
   wherein E is an alkylenoxy unit according to formula II:

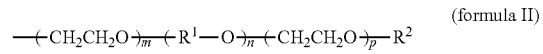

wherein
said $-(R^1-O)_n-$ unit is an inner block;
$R^1$ is independently selected from the group consisting of 1,2-propylene, 1,2-butylene, and 1,2-pentene;

R² is independently selected from the group consisting of H, any of $C_1$ to $C_{22}$ alkyl, and any of $C_7$ to $C_{22}$ aralkyl m is an integer independently selected from values in the range of from 5 to 18;

n is an integer independently selected from values in the range of from 1 to 5; and p is an integer independently selected from values in the range of from 2 to 14.

2. Substituted polyetheramine according to claim 1, wherein said substituted polyetheramine is further modified by at least one of quaternization, protonation, sulfation, transsulfation, and phosphation.

3. Substituted polyetheramine according to claim 1, wherein A is a $C_1$-alkylene.

4. Substituted polyetheramine according to claim 1, wherein N-(hydroxyalkyl)amines according to formula Ia and not N-(hydroxyalkyl)amines according to formula Ib are condensed.

5. Substituted polyetheramine according to claim 1, wherein at least one of $R^3$, $R^{3*}$, $R^4$, $R^{4*}$, $R^5$, $R^{5*}$, $R^6$, $R^{6*}$, $R^7$ and $R^{7*}$ is independently selected from the group consisting of H, methyl and ethyl.

6. Substituted polyetheramine according to claim 1, wherein $R^8$ is selected from the group consisting of H, methyl, ethyl, and butyl.

7. Substituted polyetheramine according to claim 1, wherein $R^1$ is 1,2-propylene.

8. Substituted polyetheramine according to claim 1, wherein $R^2$ is one of H, $C_1$ alkyl, $C_2$ alkyl, $C_3$ alkyl, and $C_4$ alkyl.

9. Substituted polyetheramine according to claim 1, wherein m is 10 to 12.

10. Substituted polyetheramine according to claim 2, wherein said substituted polyetheramine is further modified by at least one of quaternization and quaternization with additional sulfation.

11. Substituted polyetheramine according to claim 1, wherein $R^{3*}$, $R^{4*}$, $R^{5*}$ $R^{6*}$, and $R^{7*}$ are H, and $R^3$, $R^4$, $R^5$, $R^6$, $R^7$ are one of H and methyl.

12. Substituted polyetheramine according to claim 1, wherein n is 2 to 3.

13. Substituted polyetheramine according to claim 1, wherein p is 8 to 9.

* * * * *